United States Patent
Stovicek et al.

(10) Patent No.: US 9,311,426 B2
(45) Date of Patent: Apr. 12, 2016

(54) ORIENTATION-DEPENDENT PROCESSING OF INPUT FILES BY AN ELECTRONIC DEVICE

(75) Inventors: Thomas Jan Stovicek, San Francisco, CA (US); Matthew Nicholaos Staikos, Toronto (CA); Donald James Lindsay, Mountain View, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/218,726

(22) Filed: Aug. 26, 2011

(65) Prior Publication Data

US 2013/0033523 A1  Feb. 7, 2013

Related U.S. Application Data

(60) Provisional application No. 61/515,034, filed on Aug. 4, 2011.

(51) Int. Cl.
| | | |
|---|---|---|
| *G09G 5/00* | (2006.01) | |
| *G06F 17/30* | (2006.01) | |
| *G06F 17/22* | (2006.01) | |

(52) U.S. Cl.
CPC ...... *G06F 17/30905* (2013.01); *G06F 17/2288* (2013.01)

(58) Field of Classification Search
CPC .................................................. G06F 17/2288
USPC ................... 715/234, 238, 781; 345/649, 659
See application file for complete search history.

(56) References Cited

U.S. PATENT DOCUMENTS

| | | | |
|---|---|---|---|
| 5,661,632 A * | 8/1997 | Register | 361/679.3 |
| 6,597,384 B1 * | 7/2003 | Harrison | 345/204 |
| 6,882,335 B2 | 4/2005 | Saarinen | |
| 6,938,101 B2 | 8/2005 | Hayes et al. | |
| 6,983,331 B1 * | 1/2006 | Mitchell et al. | 709/246 |

(Continued)

FOREIGN PATENT DOCUMENTS

| | | |
|---|---|---|
| EP | 2159665 A1 | 3/2010 |
| EP | 2166438 A1 | 3/2010 |

OTHER PUBLICATIONS thewonderfactoryny, "Time Magazine iPad App Demo", uploaded on Apr. 5, 2010, http://www.youtube.com/watch?v=avM3Aor7Ptg, accessed Jun. 27, 2011, pp. 1-3.

(Continued)

*Primary Examiner* — Mohammed-Ibrahim Zuberi
(74) *Attorney, Agent, or Firm* — Fish & Richardson P.C.

(57) ABSTRACT

An electronic device may have a display screen usable in at least two orientations, such as landscape orientation and portrait orientation. Provided in this disclosure is selective rendering of a structured document according to the orientation of the display screen. A structured document such as as webpage is rendered (as a first rendered document) for display according to the document object model structure and optionally styles provided with the webpage. The same webpage is rendered (as a second rendered document) by removing or replacing selected objets in the document object model structure, or by applying different style directives than included in the originally received webpage. When the display screen is in a first orientation, the first rendered document is displayed. When a change in orientation of the display screen to the second orientation is detected, the second rendered document is displayed.

20 Claims, 9 Drawing Sheets

(56) References Cited

U.S. PATENT DOCUMENTS

| | | | |
|---|---|---|---|
| 7,222,306 B2* | 5/2007 | Kaasila et al. | 715/801 |
| 7,479,949 B2 | 1/2009 | Jobs et al. | |
| 7,791,594 B2* | 9/2010 | Dunko | 345/173 |
| 8,122,372 B2* | 2/2012 | Ferlitsch et al. | 715/782 |
| 8,131,457 B2* | 3/2012 | Kumada et al. | 701/533 |
| 8,181,107 B2* | 5/2012 | Melnyk et al. | 715/238 |
| 8,626,491 B2* | 1/2014 | Gattani et al. | 704/9 |
| 2002/0059265 A1 | 5/2002 | Valorose, III | |
| 2002/0180767 A1* | 12/2002 | Northway et al. | 345/698 |
| 2003/0085870 A1* | 5/2003 | Hinckley | 345/156 |
| 2004/0157647 A1* | 8/2004 | Takahashi | 455/566 |
| 2004/0201595 A1* | 10/2004 | Manchester | 345/649 |
| 2004/0204130 A1* | 10/2004 | Khazaka et al. | 455/566 |
| 2004/0223004 A1* | 11/2004 | Lincke et al. | 345/649 |
| 2005/0055632 A1 | 3/2005 | Schwartz et al. | |
| 2005/0068337 A1* | 3/2005 | Duarte et al. | 345/649 |
| 2005/0143124 A1* | 6/2005 | Kennedy et al. | 455/556.1 |
| 2006/0005156 A1* | 1/2006 | Korpipaa et al. | 717/100 |
| 2006/0197753 A1* | 9/2006 | Hotelling | 345/173 |
| 2007/0004451 A1* | 1/2007 | Anderson | 455/556.1 |
| 2007/0035527 A1* | 2/2007 | Cheon et al. | 345/173 |
| 2007/0075965 A1* | 4/2007 | Huppi et al. | 345/156 |
| 2008/0021777 A1 | 1/2008 | Mack et al. | |
| 2008/0046506 A1 | 2/2008 | Broda | |
| 2008/0122796 A1 | 5/2008 | Jobs et al. | |
| 2008/0139191 A1* | 6/2008 | Melnyk et al. | 455/419 |
| 2008/0165152 A1 | 7/2008 | Forstall et al. | |
| 2008/0209442 A1* | 8/2008 | Setlur et al. | 719/318 |
| 2009/0002335 A1 | 1/2009 | Chaudhri | |
| 2009/0191854 A1 | 7/2009 | Beason | |
| 2009/0279143 A1* | 11/2009 | St. Jacques et al. | 358/3.28 |
| 2010/0053089 A1 | 3/2010 | Kwok et al. | |
| 2010/0064244 A1 | 3/2010 | Kilpatrick, II et al. | |
| 2010/0077341 A1 | 3/2010 | Chen | |
| 2010/0083163 A1* | 4/2010 | Maghoul et al. | 715/781 |
| 2010/0245209 A1 | 9/2010 | Miller et al. | |
| 2010/0302278 A1* | 12/2010 | Shaffer et al. | 345/659 |
| 2010/0321275 A1 | 12/2010 | Hinckley et al. | |
| 2010/0323762 A1 | 12/2010 | Sindhu | |
| 2011/0113352 A1* | 5/2011 | Cundill et al. | 715/760 |
| 2011/0126141 A1 | 5/2011 | King et al. | |
| 2011/0167366 A1* | 7/2011 | Wagner | 715/765 |
| 2012/0005571 A1* | 1/2012 | Tang et al. | 715/234 |
| 2012/0026098 A1* | 2/2012 | Ladouceur et al. | 345/173 |
| 2012/0151308 A1* | 6/2012 | Falkenberg et al. | 715/201 |
| 2012/0192118 A1* | 7/2012 | Migos et al. | 715/863 |
| 2012/0256949 A1* | 10/2012 | Treat et al. | 345/629 |
| 2012/0311438 A1* | 12/2012 | Cranfill et al. | 715/256 |
| 2013/0050249 A1* | 2/2013 | Grabowski et al. | 345/619 |

OTHER PUBLICATIONS

Engage Interactive ltd, "Tutorial: Building a website for the iPhone", Jun. 19, 2008, http://www.engageinteractive.co.uk/blog/2008/06/19/tutorial-building-a-website-for-the-iphone/, accessed Jun. 27, 2011, pp. 1-109.

Black, J., "Learn How to Develop for the iPhone", Aug. 18, 2008, http://net.tutsplus.com/tutorials/tools-and-tips/learn-how-to-develop-for-the-iphone/, accessed Feb. 16, 2012, pp. 1-8.

Alvares, M., "The iPad and the Media Publishing Industry", Aug. 16, 2010, http://smokingapples.com/opinion/magazines-ipad/, accessed Jun. 27, 2011, pp. 1-13.

Duncan, L., "Bundle Diving in the Wired iPad App.", posted May 28, 2010, http://laytonduncan.com/post/640355763/bundle-diving-in-the-wired-ipad-application, accessed Jun. 27, 2011, pp. 1-3.

Colbow, B., "iPad Magazine Interface Design", posted Jul. 21, 2010, http://mobile.tutsplus.com/articles/theory/ipad-magazine/, accessed Jun. 27, 2011, pp. 1-7.

LePage, P., "This End Up: Using Device Orientation", Apr. 29, 2011, http://www.html5rocks.com/en/tutorials/device/orientation/, accessed Feb. 16, 2012, pp. 1-16.

8164.org, "Designing for the iPad", 2010, http://www.8164.org/designing-for-the-ipad/, accessed Feb. 21, 2012, pp. 1-14.

Grigsby, J., "iPad Orientation CSS", Apr. 5, 2010, http://www.cloudfour.com/ipad-orientation-css/, accessed Feb. 21, 2012, pp. 1-5.

Franke, F., "Predefined CSS Styles", http://www.lakercompendium.com/how-to-use/dossiers-grid-and-styles/predefined-css-styles/, accessed Feb. 21, 2012, pp. 1-4.

Robson, E., "Using CSS Media Queries to Style Your iPhone and iPad HTML", posted Apr. 5, 2010, http://elisabethrobson.com/?p=777, accessed Feb. 21, 2012, pp. 1-8.

Arc90 Inc., "arc90labs-readability", 2010, http://code.google.com/p/arc90labs-readability/source/browse/trunk/js/readability.js, accessed Feb. 21, 2012, pp. 1-19.

Apple Inc., "Safari the world's most advanced mobile web browser", http://www.apple.com/iphone/features/safari.html, accessed Jun. 30, 2011, pp. 1-5.

Ponsard, C., Fries, V. "Enhancing the Accessibility for All of Digital Comic Books", vol. I No. 5 (Mar. 2009), pp. 127-144.

Martelin, T., "Orientation Awareness in Declarative User Interface Languages for Mobile Devices: A Case Study and Evaluation", Master's Thesis, Jun. 1, 2010, pp. 1-79.

International Searching Authority, "International Preliminary Report on Patentability", mailed Feb. 13, 2014 (10 pages).

Apple Insider Staff, "Inside Apple's iOS 5: Safari Reader, private browsing, tabs on iPad", Apple Insider, Jun. 7, 2011 (14 pages). Please note: certain images did not print, they are available at: http://appleinsider.com/articles/11/06/07/inside_apples_ios_5_safari_reader_private_browsing_tabs_on_ipad/.

Kris Sangani, "Software Safari 5.0", <www.theiet.org/magazine>, Sep. 11, 2010 (2 pages).

Communication Pursuant to Article 94(3) EPC issued in EP Application No. 12702678.9 on May 20, 2015; 8 pages.

Anonymous: "Preserve HTML Font-Size When iPhone Orientation Changes from Portrait to Landscape", Apr. 2010; stackoverflow.com; 1 page.

* cited by examiner

37 CFR Fairytales :: Rumpelstiltskin, Chapter 2

Just then, an impish little figure popped into view, seemingly out of nowhere.

"What's the matter?" asked the imp. "Can't deliver what you promised? If I've told one fairy tale archetype, I've told them all: promising to convert cereal into precious metals is an oversell."

"Don't be ridiculous. I know how to spin straw into gold—in fact, I developed the process and have a patent pending," the miller's daughter indignantly replied. "That's not the problem. Look at this," she continued, pointing to the inanimate wheel. "When I rotate it, it does nothing! Don't you think this thing should do *something* when it's turned?

"Well, here's your answer," responded the imp, bending over the wheel. "Your drive band's broken. But this is your lucky day, I've got a replacement right here." He removed the old drive band and deftly snapped a new one into place. "That'll be 17 pieces of silver, milady."

"But I have no money!" cried the miller's daughter.

"No problem there. Just give me an exclusive licence when you get your patent."

620

"But how will I—" began the miller's daughter. "Continue to spin gold?" replied the imp. "You won't need to. You're going to marry the king, remember? You know how it goes. We've all got our roles to play in the patriarchal folkloric social system. So license your patent to someone who'll actually make use of the invention."

[X] ——— 630

"But I have no money!" cried the miller's   610
daughter.

ORIENTATION-DEPENDENT PROCESSING OF INPUT FILES BY AN ELECTRONIC DEVICE

TECHNICAL FIELD

The present disclosure relates generally to automatically changing the display mode of a structured document (such as a webpage) based on the orientation of an electronic device.

TECHNICAL BACKGROUND

Content viewing and editing applications such as web browsers and similar applications are used to present structured documents, such as webpages and other HTML files, to a user via a display interface of an electronic device. Typically, the application parses one or more input files including the structured document, such as a webpage—which may be retrieved from local storage at the electronic device, or alternatively received over a network connection from a network resource—to render the input file as a rendered document for display on a display screen of the electronic device. The structured document itself may include a number of different content elements, such as images, text, hyperlinks, embedded multimedia components, and metadata, many of which may be visible when the rendered document is displayed. The presence of different elements in the structured document thus increases the processing time required to prepare the render document for display.

In a portable electronic device such as a smartphone or tablet, the display area available on the device's display screen limits the amount of content that can be displayed on the screen at a given time, potentially resulting in a cluttered view of a structured document containing many elements. Further, those portable electronic devices having an integrated display screen may be usable in more than one orientation, such as a landscape orientation mode and a portrait orientation mode, which typically have different screen proportions, thus affecting the appearance of the rendered document displayed on the screen.

BRIEF DESCRIPTION OF THE DRAWINGS

In drawings which illustrate by way of example only embodiments of the present disclosure, in which like reference numerals describe similar items throughout the various figures.

FIG. 6 is a further illustration of a display of the example structured document in a portrait orientation.

DETAILED DESCRIPTION OF THE INVENTION

Figure 1:
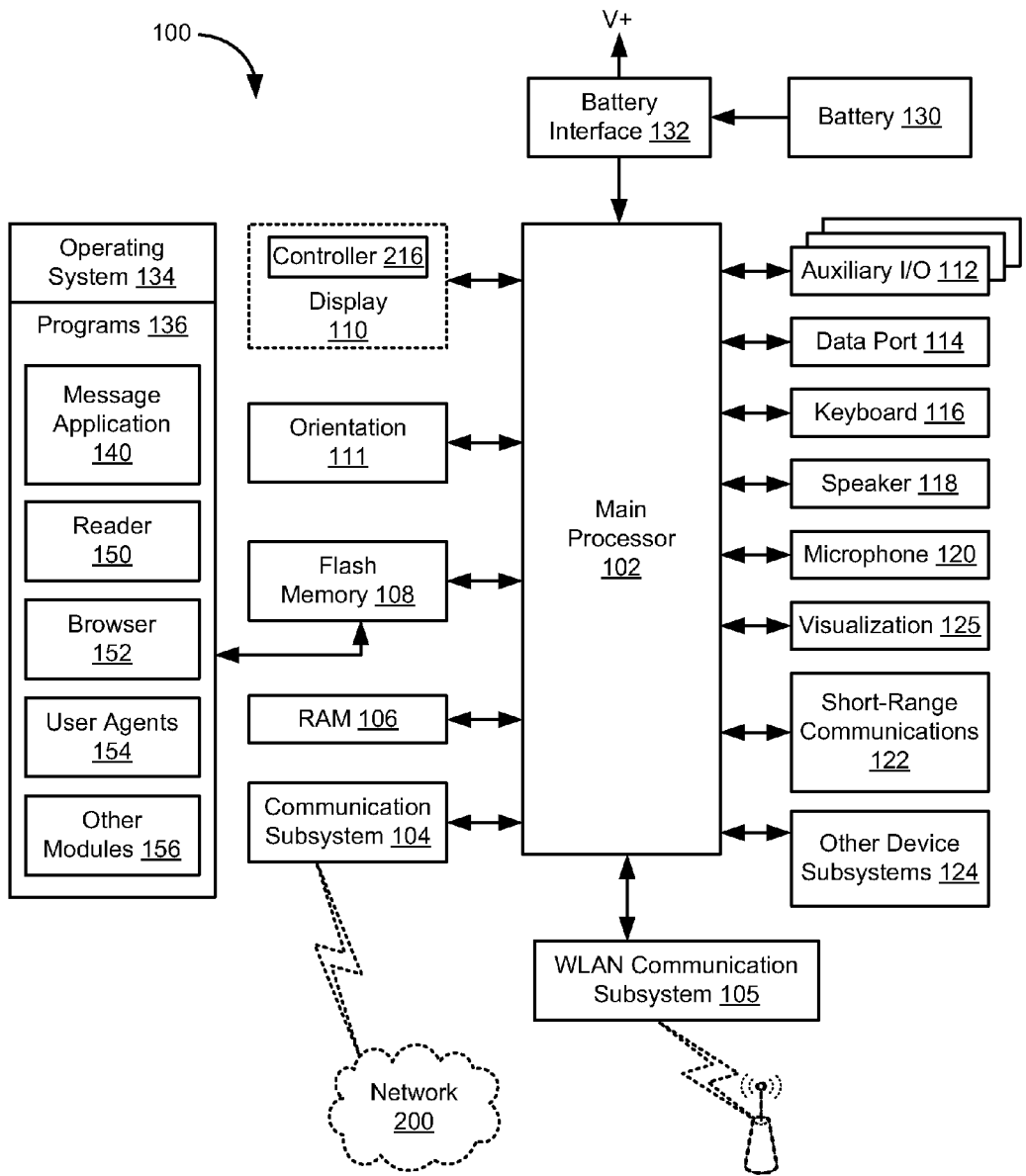
FIG. 1 is a block diagram of an embodiment of an electronic device.

The embodiments described herein provide a device, system and method for selectively processing and displaying a webpage or other structured document according to a detected orientation of a display screen of an electronic device. In a first orientation mode (for example, landscape orientation) the structured document may be displayed with more content elements or with style settings provided for in the structured document. In a second orientation mode (for example, portrait orientation), the structured document may be displayed with fewer content elements or with a specialized reader-style configuration provided for in a locally configured style module. In the various embodiments, the display of the structured document automatically changes to a presentation format optimized for the display orientation based on detecting a change in the display orientation of the electronic device.

In one embodiment the selective processing includes altering the selection of elements from in the structured document that are rendered for display in each orientation mode, without requiring retrieval of a separate structured document having an altered selection of elements, and without requiring a provider of the structured document to pre-define those elements to be included in the selection. The selective processing can include processing the structured document for display in a first mode by generating an intermediate model for the structured document including all content elements of the structured document, rendering the structured document for display in accordance with the intermediate model for a landscape orientation mode; and, when a rendered version of the structured document in a portrait orientation mode is required, altering the intermediate model to remove selected ones of the content elements, and rendering the structured document for display in accordance with the altered intermediate model for a portrait orientation mode.

In another embodiment, the selective processing includes altering the style directives that are used during rendering the structured document for each orientation mode, without requiring a provider of the structured document to pre-define both style directives. The selective processing can include preparing a first rendered document for display in a landscape orientation mode in accordance with a style directive included in the structured document, and preparing a second rendered document for display for display in a portrait orientation mode in accordance with locally configured style directives.

These embodiments will be described and illustrated primarily in relation to electronic devices, such as tablet computers, smartphones, or any other portable electronic device, which may or may not be equipped to communicate over wireless networks or public networks. It will be appreciated by those skilled in the art, however, that this description is not intended to limit the scope of the described embodiments to implementation on these particular systems. For example, the methods and systems described herein may be applied to any appropriate communication device or data processing device adapted to process input files for display and to send the processed data for display to a display interface, whether or not the device is adapted to communicate with another communication or data processing device using a network communication interface adapted to communicate over a fixed or wireless connection, whether portable or wirelessly enabled or not, whether provided with voice communication capabilities or not, and additionally or alternatively adapted to process data and carry out operations on data in response to user commands for any number of purposes, including productivity and entertainment. Thus, the embodiments described herein may be implemented on electronic devices adapted for communication or messaging, including without limitation cellular phones, smartphones, wireless organizers, personal digital assistants, desktop computers, terminals, laptops, tablets, handheld wireless communication devices, notebook computers, portable gaming devices, Internet-connected televisions, set-top boxes, digital picture frames, digital cameras, in-vehicle entertainment systems, entertainment devices such as MP3 or video players, and the like. Unless expressly stated, an electronic device may include any such device or any device capable of receiving or retrieving a structured document such as a webpage and causing information therefrom to be displayed. As contemplated herein, the electronic device may have an integrated display interface, or may be configured to output data to be painted to an external display unit such as an external monitor or panel, television screen, projector, or virtual retinal display (via a data port or transmitter, such as a Bluetooth® transceiver, USB port, HDMI port, DVI port, and the like). References herein to a "display," "display screen" or "display interface" are intended to encompass both integrated and external display units.

FIG. 1 is a block diagram of an example embodiment of an electronic device 100 that may be used with the embodiments described herein. The electronic device 100 includes a number of components such as a main processor 102 that controls the overall operation of the electronic device 100. It should be understood that the components described in FIG. 1 are optional and that an electronic device used with various embodiments described herein may include or omit components described in relation to FIG. 1.

The electronic device 100 may be a battery-powered device including a battery interface 132 for receiving one or more rechargeable batteries 130. Communication functions, including data and voice communications, are performed through one or more communication subsystems 104, 105, and/or 122 in communication with the processor 102. Data received by the electronic device 100 can be decompressed and decrypted by decoder 103, operating according to any suitable decompression techniques, and encryption/decryption techniques according to one or more various encryption or compression standards known to persons of skill in the art.

If equipped with a communication subsystem 104, this subsystem 104 receives data from and sends data to wireless network 200. In this embodiment of the electronic device 100, the communication subsystem 104 is configured in accordance with one or more wireless communications standards. New wireless communications standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for the wireless communications standard, and optionally other network communications.

The electronic device 100 may be provided with other communication subsystems, such as a wireless LAN (WLAN) communication subsystem 105 or a short-range and/or near-field communications subsystem 122 also shown in FIG. 1. The WLAN communication subsystem 105 may operate in accordance with a known network protocol such as one or more of the 802.11™ family of standards developed or maintained by IEEE. The communications subsystems 105 and 122 provide for communication between the electronic device 100 and different systems or devices without the use of the wireless network 200, over varying distances that may be less than the distance over which the communication subsystem 104 can communicate with the wireless network 200. The subsystem 122 can include an infrared device and associated circuits and/or other components for short-range or near-field communication.

It should be understood that any of the communication subsystems 104, 105, 122 may optionally be included in the electronic device 100. Alternatively, a communication subsystem provided in a dongle or other peripheral device (not shown) may be connected to the electronic device 100, either wirelessly or by a fixed connection such as a USB port, to provide the electronic device 100 with access to a network. If provided onboard the electronic device 100, the communication subsystems 104, 105 and 122 may be separate from, or integrated with, each other.

The main processor 102 also interacts with additional subsystems, if present, such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, the communications 104, 105, 122 and other device subsystems 124. The electronic device may also be provided with an orientation sensor or module 111, used to detect the orientation of the display 110. In the case of a portable (such as a handheld) electronic device 100, display 110 is typically integrated with the device 100, as well as the orientation module 111. In the case of an electronic device 100 where the display 110 is external to the device, the orientation module 111 may be integrated with the external display screen. The orientation module 111 may include any suitable module that may be selected by those skilled in the art, such as an accelerometer which may be used to detect gravity- or motion-induced forces and their direction. For example, the orientation module can have a digital three-axis accelerometer connected to an interrupt and serial interface of the processor 102, or another microcontroller of the device 100 (not shown). The processor 102 or microcontroller determines the device 100 orientation in accordance with acceleration measured by the accelerometer and provides the detected orientation to the operating system, or raw acceleration data measured by the accelerometer can be sent to the processor 102 so that device orientation is determined by the operating system of the electronic device 100. The orientation module 111 may thus be considered to include the accelerometer, microcontroller or those modules of the processor 102 executing to determine orientation. It should be understood that the orientation module 111 may optionally be present at an external display, and provide orientation determination for the display screen associated with the electronic device 100. Whether the orientation module 111 is located at an external display or is located at the electronic device 100 having an integrated display, the orientation determined by the orientation module 111 is related to the orientation of the display screen associated with the mobile device.

The orientation or acceleration detected at the electronic device 100 (or at the external display 110) may be processed to determine a response of the electronic device 100, such as an orientation of a graphical user interface displayed on the display 110 in response to a determination of the current orientation detected. Upon determination of the current orientation or a change in orientation, the operating system may issue notifications to executing applications of the current orientation. Individual applications may register a device orientation event notification listener with the operating system to receive such notifications. Alternatively, applications may query the operating system for the current orientation at defined intervals.

In some embodiments, the electronic device 100 may be a touchscreen-based device, in which the display interface 110 is a touchscreen interface that provides both a display for communicating information and presenting graphical user interfaces, as well as an input subsystem for detecting user input that may be converted to instructions for execution by the device 100. The touchscreen display interface 110 may be the principal user interface provided on the electronic device 100, although in some embodiments, additional buttons, variously shown in the figures or a trackpad, or other input means may be provided. If a touchscreen display interface 110 is provided, then other user input means such as the keyboard 116 may or may not be present. The controller 216 and/or the processor 102 may detect a touch by any suitable contact member on the touch-sensitive display 110.

A visualization processor or module 125 may be included in the electronic device 100. The visualization module 125 analyzes and processes data for visualization on the display 110. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102.

The electronic device 100 also includes an operating system 134 and software components 136 to 152 which are described in more detail below. The operating system 134 and the software components 136 to 152 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 140 to 152, such as specific device applications, or parts thereof, can be temporarily loaded into a volatile store such as the RAM 106. Select other modules 152 may also be included, such as those described herein. Other software components can also be included, as is well known to those skilled in the art.

A subset of software applications 136 that control basic device operations may be installed on the electronic device 100 during its manufacture. Other software applications include a message application 140 that can be any suitable software program that allows a user of the electronic device 100 to send and receive electronic messages. Various alternatives exist for the message application 140 as is well known to those skilled in the art. Messages that have been sent or received by the user are typically stored in the flash memory 108 of the electronic device 100 or some other suitable storage element in the electronic device 100. In at least some embodiments, some of the sent and received messages can be stored remotely from the device 100 such as in a data store of an associated host system with which the electronic device 100 communicates.

Other types of software applications can also be installed on the electronic device 100, such as feed or content readers 150, web browsers 152, other user agents 154, and other modules 156. These software applications may be supplied by the electronic device manufacturer or operating system provider, or may be third party applications. The additional applications can be loaded onto the electronic device 100 through at least one of the communications subsystems 104, 105, 122, the auxiliary I/O subsystem 112, the data port 114, or any other suitable device subsystem 124. This flexibility in application installation increases the functionality of the electronic device 100 and can provide enhanced on-device functions, communication-related functions, or both.

In use, a received signal such as a text message, an e-mail message, or web page download will be processed by the receiving communication subsystem 104, 105, 122 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 is a touchscreen, then the auxiliary subsystem 112 may still include one or more of the devices identified above.

The communication subsystem component 104 may include a receiver, transmitter, and associated components such as one or more embedded or internal antenna elements, Local Oscillators (LOs), and a processing module such as a Digital Signal Processor (DSP) in communication with the transmitter and receiver. The particular design of the communication subsystems 104, 105, 122, or other communication subsystem is dependent upon the communication network 200 with which the electronic device 100 is intended to operate. Thus, it should be understood that the foregoing description serves only as one example.

In some electronic devices 100, particularly those provided with integrated displays 100 (although as noted above, the embodiments herein are not necessarily restricted to only such devices), the processor 102, visualization module 125, and other components are configured to respond to detected changes in orientation of the device 100. For example, a portable electronic device 100 such as a tablet computer or smartphone is typically provided with a rectangular shaped display 110. The proportions and size of the display may vary; for example, common proportions of the width and height of such displays 110 include 4:3 and 16:9, but as those skilled in the art will readily appreciate, these proportions can be varied. Since the display 110 is rectangular with one dimension greater than the other, the electronic device 100 can be held in two regular orientations, conventionally referred to as landscape (where the display 110, as viewed by a user, is oriented so that its major axis (i.e., longer dimension) is substantially horizontal and its minor axis (i.e., shorter dimension) is substantially vertical) and portrait (where the display 110, as viewed by a user, is oriented so that its minor axis is substantially horizontal and its major axis is substantially vertical).

The orientation module 111, as explained above, operates to detect when the display 110 is in one or the other orientation or is in an orientation angle that is sufficiently close to landscape or portrait orientation such that the orientation module 111 or the operating system 134 determines that the current orientation is either landscape or portrait orientation. For example, the orientation module 111 or the operating system 134 may be configured such that an orientation of the device 100 or display 110 within ±30° (or some other defined tolerance angle) of landscape or portrait orientation defines the current orientation as landscape or portrait orientation, respectively. In the embodiments described herein, "landscape" and "portrait" orientations include any electronic device 100 or display 110 orientation that falls within a predefined tolerance for landscape or portrait orientations. The electronic device 100 or display 110 may of course be positioned in other, non-regular orientations, where the major or minor axes of the display 110 are at an angle from the horizontal or vertical.

Further, the electronic device 100 can be configured to display content on the display 110 in landscape mode, where the content rendered for display is painted to the display 110 so that it appears upright when the display 110 is in landscape orientation, and in portrait mode, where the content rendered for display is painted to the display so that it appears upright when the display 110 is in portrait mode. Notwithstanding the present disclosure, the rendered content may in fact be provided with the same layout and appearance in both landscape and portrait orientation modes; however, because the dimensions of the screen vary between landscape and portrait, the content may be scaled up or down to fit the width (or the height) of the display 110 in landscape or portrait mode.

The content that is rendered for display may be obtained from a structured document, such as a webpage or similar file, which is either retrieved from memory at the device such as flash memory 108 or RAM 106, or over a network connection, such as the wireless network 200, from a network resource such as a web server. In the embodiments described herein, reference will be made principally to rendering a webpage, but it will be appreciated by those skilled in the art that these embodiments may apply equally to other files, such as other types of structured documents. A structured document may be based on an XML-compliant, XML-like, or XML-based markup language, which, as those skilled in the art will appreciate, includes webpages such as HTML-based documents.

A webpage (or other structured document) may include a number of components. The webpage may contain zero, one or more elements including content elements (e.g., text, hyperlinks, graphics, user interface elements, video, animation, and the like, as well as containers for containing one or more of the aforementioned elements). Further, as is well understood by those in the art, a webpage is typically defined with a header and body section (as defined by opening and closing <head> and <body> tags within the webpage). The header section of the document typically contains document parameters and descriptions, scripts, formatting instructions, and other instructions or definitions globally applying to the document. The body typically includes content that is processed for display to the user, in accordance with any applicable instructions or definitions contained in the header, together with other instructions or directives provided in associated files that may be provided to the electronic device 100 together with the webpage document itself. The header may also contain content that, when the webpage is rendered for display at the device 100, is presented to the user. An example is a <title> element in the header, which contains a text string defined as the webpage title.

The number of content elements contained in a webpage is generally within the discretion of the author of the webpage. Frequently, webpages contain a number of elements, some of which may be considered to be aesthetically distracting to the user viewing the page. Examples of such distracting or extraneous content include advertisements, banner title graphics, sidebars containing navigation links or other content, footers, and the like. Accordingly, one embodiment herein provides a process by which a given document, such as a webpage, is selectively rendered so as to remove selected content according to an orientation of the electronic device display screen.

Figure 2:
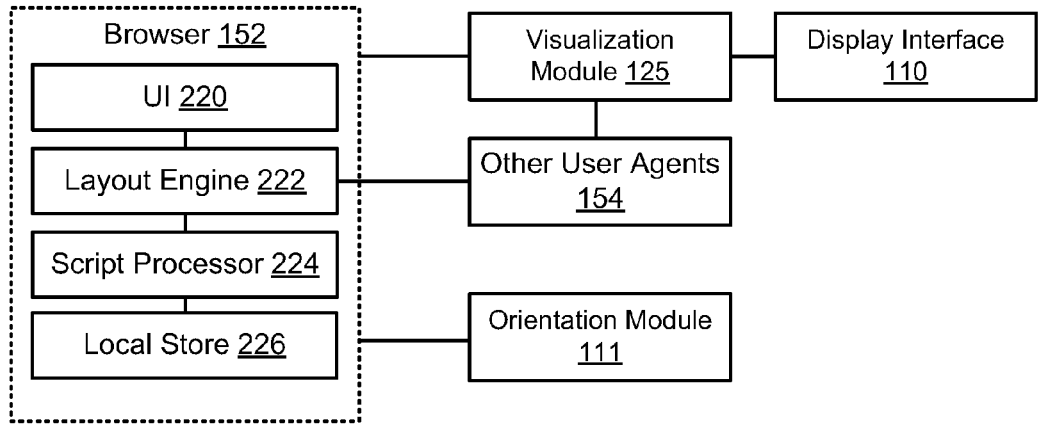
FIG. 2 is a schematic diagram of select components of the electronic device of FIG. 1.

A schematic diagram reflecting selected components of a web browser application 152 executing at the electronic device for processing and rendering input webpages and other files for display in accordance with these embodiments is illustrated in FIG. 2. The browser application 152 may include interoperating components such as a user interface engine 220, layout or rendering engine 222, a script processor, plug-in, or virtual machine 224 for executing code snippets, scripts and the like embedded in, received with, or invoked by the webpage being processed. The browser application 152 may also have its own local store 226, allocated to the application from the volatile and/or non-volatile memory 106, 108 of the electronic device 100. When a webpage is received or retrieved for processing and display, the webpage is processed by the layout engine 222, with any scripts embedded in the webpage passed to the script processor 224 for execution. The layout engine 222 parses the webpage to generate a rendered document for output on the display 110. Thus, as illustrated in FIG. 2, the rendered output is provided to the visualization module 125 and thence to the display 110.

The techniques used by the layout engine 222 to prepare a rendered document are generally known in the art. In the embodiments herein, processing the input webpage to generate a rendered document for the visualization module 125 is referred to as "preparing" or "rendering", regardless how the processing of the webpage occurs. Generally, the rendering process includes parsing of the webpage, and constructing one or more models reflecting a hierarchical arrangement of nodes representing the various elements provided in the webpage. A model of the hierarchical arrangement is constructed in memory (e.g., the local store 226), to which model any defined styles are applied to determine the position and appearance of content elements of the webpage in the display view of the browser application 152. The result is then sent to the visualization module 125 for painting or otherwise outputting to the display interface 110. Styles, scripts and similar data may be included in the webpage provided to the electronic device 100, although in many cases such information may be provided in a separate file (such as a Cascading Style Sheet or CSS file) that is identified in the header section of the webpage, and retrieved from the web server by the browser application 152 when the webpage is processed by the browser application 152. Alternatively, default styles defined at the browser application 152 may be applied to the webpage elements. When a content element in the webpage has an associated style parameter (either in the webpage itself or in a CSS file identified by the webpage) the style parameter is referred to as a style directive.

Those skilled in the art will appreciate that a number of layout engines 222 may be implemented in the browser application 152; generally, when presented with a structured document, each engine applies a series of rules to define a document object model, to which additional information from the webpage (content, styles, and so forth) are applied to determine the visual output to be provided to the visualization module 125.

The layout engine 222 may be invoked by other applications on the electronic device 100. In FIG. 2, the browser layout engine 222 is illustrated as interoperating with other user agents 154, which can include an email or other messaging application, since electronic messages may be formatted as HTML or other structured document files that the layout engine 222 can render.

Also as shown in FIG. 2, the browser application 152 may be in communication with the orientation module 111 to receive data pertaining to the current orientation of the electronic device 100 and/or display 110. Alternatively, the browser application 152 may receive notifications of current orientation from the operating system 134 when the orientation changes, as described above.

Figure 3:
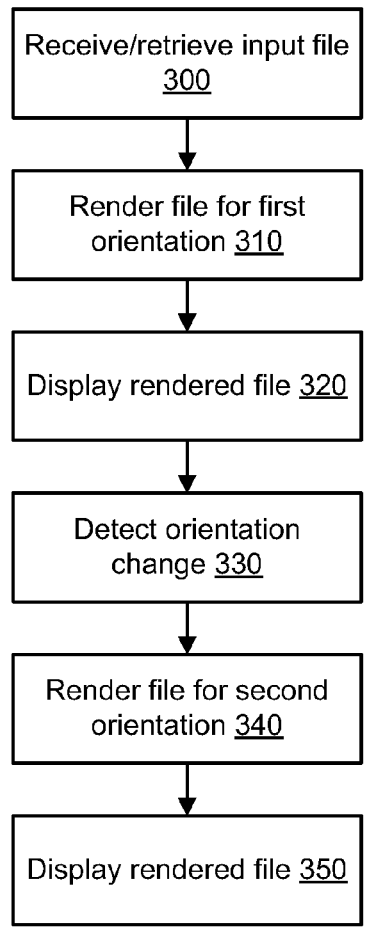
FIG. 3 is a flowchart illustrating a process for displaying a structured document in a first and second orientation.

With the above-described browser application 152, then, a general process for implementing the embodiments herein is illustrated in the flowchart of FIG. 3. At 300, an input file, which can be a structured document such as a webpage, is received or retrieved at the electronic device 100. The input file is then processed by the layout engine 222. At the time of processing, the electronic device 100 and/or display 110 will be in a first orientation; in this example, the first orientation will be assumed to be landscape orientation. At 310, the layout engine 222 renders the webpage in a first mode for display in the first orientation, and the resultant rendered document is sent for display (e.g., provided to the visualization module 125), and displayed at the display 110 of the electronic device. In this example, and as discussed below in more detail with reference to FIGS. 4 through 6, all displayable content elements of the webpage are rendered for display in a layout arrangement defined by the webpage data—i.e., as defined by the hierarchy of elements as defined by the document object model of the webpage, and applying any attributes assigned to the elements as may be defined in the webpage, and further optionally applying any style directives defined either in the webpage itself, or provided to the electronic device 100 in a separate file (such as a CSS file). Further, if any scripts associated with the webpage are provided for execution by the browser application 152, these scripts are executed by the script processor 224.

The visualization module 125 may scale the rendered document up or down to fit at least one of the dimensions of the display 110. It will be appreciated by those skilled in the art that when the webpage is rendered for display it may result in a displayable area that is greater than the dimensions of the display 110 in its current orientation, even if the rendered document is scaled up or down to fit a dimension of the display 110. It is common, for example, for only a first display portion of a rendered document to be displayed on the display 110 (either filling the entire displayable area of the display 110, or a window displayed on the display 110), while a remaining portion of the rendered document extends outside the currently visible display portion. The remaining un-displayed portion may be viewed by scrolling the rendered document, typically in response to user commands, using techniques known in the art. Thus, while the rendered document may include a number of content elements that are indeed rendered for display, not all of the rendered displayable content elements may be visible at one time when the rendered document is displayed. These content elements are nevertheless considered to be displayable content elements as they were rendered for, and are available for, display. The rendered document for use in the first orientation, in short, thus resembles a webpage as it may be conventionally rendered by a browser application that is generally compliant with commonly known HTML specifications.

At 330, a change in orientation of the display 110 and/or electronic device 100 to the second orientation is detected. In this example, this new orientation is portrait orientation. In response to this detection, the same webpage is automatically rendered for display in a second mode for the second orientation at 340. However, rather than representing the same rendered document for display and simply scaling the size of the rendered document to fit the dimensions of the second orientation, the webpage is re-rendered (as a second rendered document) so as to alter the number of displayable content elements, the styles applied to the elements, and/or the hierarchical arrangement of the displayable content elements. In doing so, those webpage elements that are considered "extraneous" or not "meaningful" may be excluded from the second rendered document, so that the second rendered document includes only a subset of the content elements of the original webpage. Furthermore, style directives included in the webpage may be ignored or overridden. In an embodiment, the style directives are replaced with locally configured style directives not included in the webpage. Processes for re-rendering the webpage and identifying those elements to be excluded are discussed in greater detail below. Once the webpage has been rendered anew, it is sent for display at 350.

It will be appreciated by those skilled in the art that the detection of the orientation change and the rendering of the webpage for the second orientation need not occur in this order. For example, once the webpage has been rendered for the first orientation, the layout engine 222 may automatically proceed to re-render the webpage for the second orientation prior to detection of orientation change at 330. By pre-rendering the webpage for the second orientation, the electronic device 100 can display the second rendered document more quickly once it is detected that the display 110 is in the second orientation, thus enhancing user experience.

Figure 4:
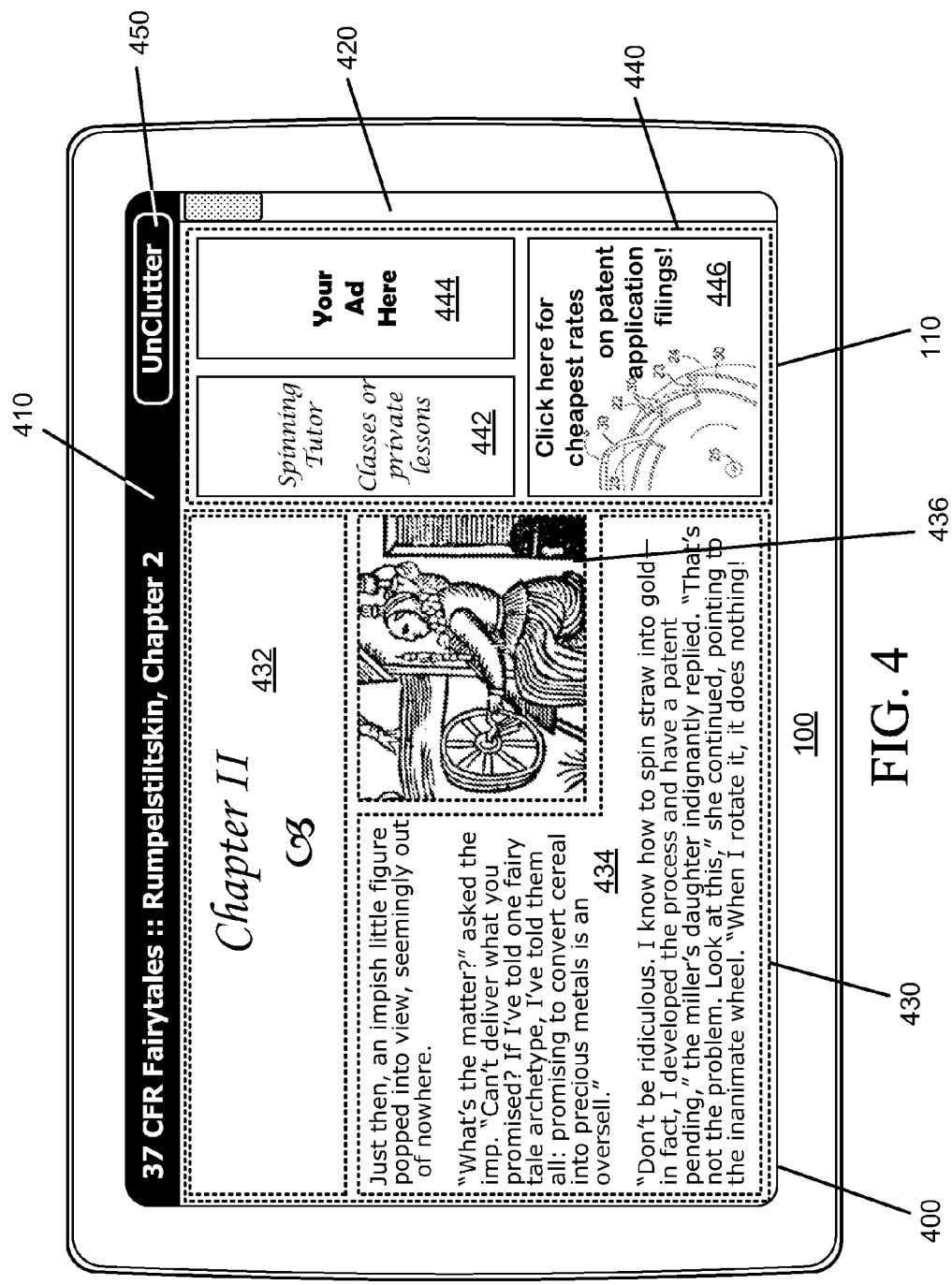
FIG. 4 is an illustration of display of an example structured document in a landscape orientation in accordance with the process of FIG. 3.

FIG. 4 provides a schematic diagram of a first rendered document 400 displayed in the first mode for the first orientation (and in this example, landscape orientation) at an electronic device 100 having an integrated display 110. In this example, the first rendered document was generated from a webpage that includes a number of content elements that are renderable for display, including image elements 432, 436, 442, 444, and 446, and text (or paragraph) element 434. In this example, any attributes or styles of the displayable content elements that were provided with the webpage (such as font size, colour, image size, padding, margins, and so forth) are also applied to the elements during rendering. As will be understood by those skilled in the art, when a browser application 152 is used to display a webpage, conventionally a title bar identifying the program executing and/or a title of the webpage is displayed in a title or program bar 410. Further, to indicate that further displayable content of the first rendered document is available for viewing, a scrollbar 420 is also displayed for actuation by a user to view additional content that is currently not visible. In some implementations, particularly those where the display 110 is a touchscreen display, the scrollbar 420 may be omitted; scrolling of the displayed rendered document is invoked by gestures applied to the touchscreen surface that are detected by the touchscreen and processed by the electronic device 100. The title bar 410 may also be omitted as well. The title bar 410 and scrollbar 420 are user interface elements that are typically generated by the user interface engine 220 of the browser 152. Attributes of these user interface elements (such as the colour of the scrollbar 420 or whether it is visible or not, and the content displayed in the title bar 410) may be defined in the webpage.

The title content, for example, is a text string conventionally defined in the <head> element of an HTML webpage. This, and other content of this nature that is output for display in a first rendered document, may be considered to be included in the plurality of displayable content objects.

The various elements in the webpage can include elements other than the image elements and text or paragraph elements illustrated in FIG. 4, and can include other block elements, inline elements, image elements, object elements, form elements, table elements, frames, logical divisions (e.g., <div> elements) and the like, as commonly defined in the art, and those elements that are rendered such that their associated content is perceptible (or available to view via scrolling) by the user in the first rendered document when displayed may be considered to be displayable content elements. In the example of FIG. 4, the images 432, 436 and the paragraph element 434 may be contained within a logical division element 430. The three images 442, 444 and 446, may be contained within another logical division element 440. These elements 430, 440 themselves may not be evident to the user when the first rendered document 400 (they are delineated with phantom lines in FIG. 4 for ease of reference), but these logical divisions 430, 440 and their associated attributes function to define the relative placement of the elements they contain, and accordingly may therefore be considered to be displayable content elements as well. Other content in the webpage, such as content tagged with a <meta> tag (i.e., metadata), scripts, style definitions, and the like, that themselves do not comprise content that is directly rendered in the first rendered document, may be considered to be outside the set of displayable content elements. As can be seen in the example of FIG. 4, there are consequently a number of displayable content elements rendered for display in the first rendered document 400, and some of these elements (such as the images 442, 444, 446) might be considered distracting from the principal content of the webpage, being the text of the paragraph element 434.

Accordingly, when the webpage is rendered and displayed in the second mode in the second orientation (in this case, portrait orientation), a simpler version of the webpage may be displayed instead by selecting only a subset of the displayable content elements provided in the original webpage. The subset may be defined as those content elements that are identified using an algorithm designed to identify element characteristics that are indicative of content generally considered to be "meaningful" to a user; definitions of such a subset are discussed with reference to FIG. 9 below. As noted above, the webpage may be pre-rendered in the second mode prior to detection of an orientation change; if this occurs, then the browser application 152 may also display an indicator 450 that a different rendering mode for the webpage is available, for example in the title bar 410. In some embodiments, this indicator 450 may be an interactive user interface element that can be actuated (for example, by clicking on, or tapping on, the user interface element) that initiates an instruction to invoke the second mode for display, even though the electronic device 100 and/or display 110 has not been rotated to the second orientation. However, by automatically invoking display of the webpage rendered in the second mode upon detection of the orientation change, there is no requirement for the user to invoke an express instruction to change the rendering mode of the webpage, thus reducing consumption of the electronic device 100 resources (e.g. processor time) in processing the user-input instruction, and reducing wear and tear on user input devices such as pointing devices or a touchscreen used to initiate the instruction.

Figure 5:
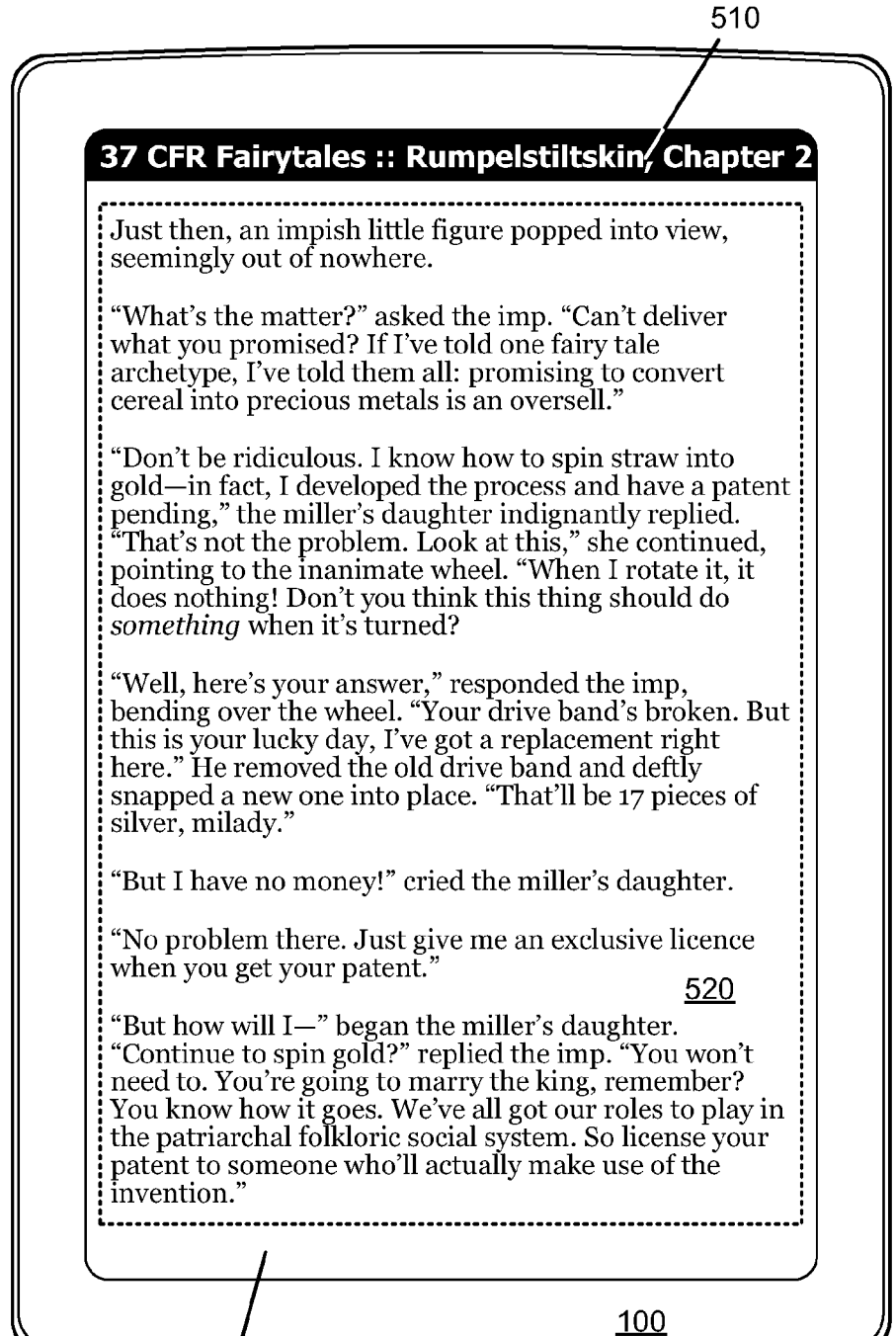
FIG. 5 is an illustration of display of the example structured document in a portrait orientation in accordance with the process of FIG. 3.

An example of this second mode is shown in FIGS. 5 and 6. FIG. 5 depicts one embodiment of the second rendered document 500 which was generated from the same webpage as FIG. 4, but re-rendered for the second orientation. The paragraph element 520 (numbered 434 in FIG. 4) is rendered for display, while the image elements 432, 442, 444, and 446 are not. In other words, the image elements 432, 442, 444, and 446 are excluded from the subset of displayable content elements that are rendered for the second rendered document 500 while the paragraph element 520 is not. In this case, attributes or style directives provided for the original webpage may be ignored, and instead locally configured style directives (for example, preset styles defined in the browser application 152) may be applied. Thus, the font of the text of the paragraph element 520 in the second mode can differ from the font applied to the paragraph element 434. In addition, as can be seen in the title bar 510 of this view of the second rendered document 500, the title content of the original webpage is retained. When the electronic device 100 and/or display 110 is returned to its previous orientation, the browser application 152 can revert to displaying the webpage as rendered for the first mode as in FIG. 4.

FIG. 6 illustrates a further example of the webpage as re-rendered for the second orientation. In this example, however, two versions of the webpage are displayed in the view 600: a first rendered document 610 is rendered from the webpage, and any applicable styles and attributes (similar to the first rendered document 400 of FIG. 4); and a second rendered document 620 (similar to the second rendered document 500 of FIG. 5) is displayed in a window overlaying the first rendered document 610. Thus, it is apparent to the user when viewing the webpage rendered in the second rendered document 620 that the "original" view of the webpage is still available for viewing. In this example, the user may actuate an interactive user interface element 630 to dismiss the display of the second rendered document 620. Further, in this example, the only element of the original webpage rendered for display in the second mode is the paragraph element (originally numbered as 434 in FIG. 4); in this case, the title element is rendered in the background display as part of the first rendered document 610. In still a further embodiment, the webpage as rendered in the second mode may be provided in a separate tabbed window of the browser application 152, if the browser application 152 is configured for tabbed web browsing.

It can be appreciated that the display of the webpage in the second mode showing only selected displayable content elements (such as the paragraph elements only) provides a visually cleaner, less cluttered view of the webpage, without the distraction of extraneous images (such as advertisements or title banners), without requiring the user to engage in any direct steps to remove or block distracting webpage elements, such as by invoking advertising blocking or filtering software to operate in conjunction with the browser application 152. Such advertising blocking or filtering software typically operates to remove from the rendered document any content that the user identifies as advertisements or otherwise undesirable content, and once identified, continues to block any content served from the same server as the identified undesirable content. Such software requires the user to not only keep the software up to date by identifying undesirable content, but also blocks all such content from those servers, even if those servers also serve more useful, desirable content.

Figure 7:
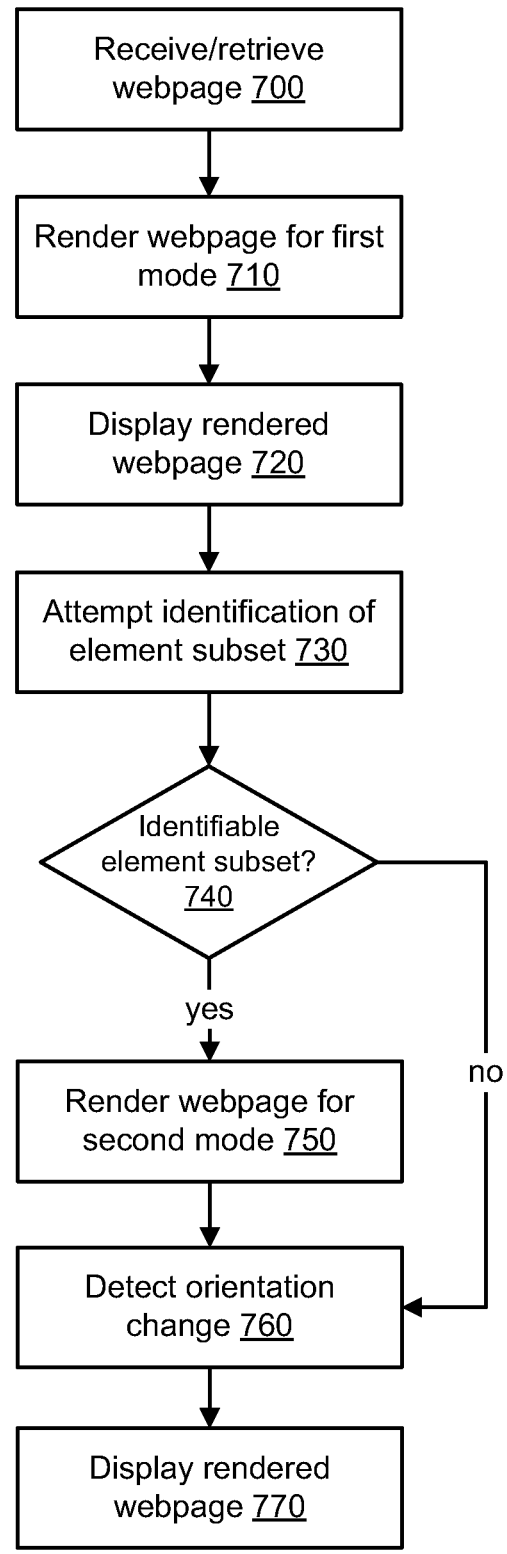
FIG. 7 is a flowchart illustrating a further process for displaying a webpage in a first and second orientation.
Figure 8:
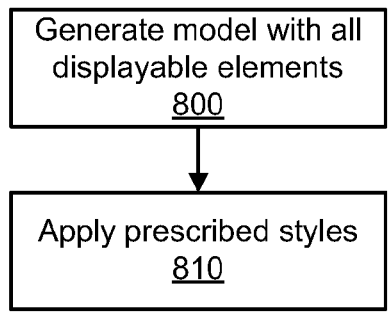
FIG. 8 is a flowchart illustrating a process for preparing a first rendered document for display in a first orientation.

In some cases, it may not be feasible to render the webpage in a second mode if no subset of displayable content elements can be identified in the webpage. This may occur when none of the displayable content elements comprise characteristics that disqualify them from inclusion in the subset. FIG. 7 illustrates a process that can be implemented with the examples of FIGS. 4 to 6 above, where a determination is made, prior to rendering the webpage in the second mode for the second orientation, whether the subset of elements can be identified. Again, at 700, the input file—in this example, a webpage—is either received over a network connection from a network resource (such as a web server), or alternatively retrieved from local memory or storage at the electronic device 100 (which may be the case if the webpage was previously received). The webpage may have one or more displayable content elements, and is rendered for display in the first (i.e., the current) orientation at 710. This first rendering may comprise rendering all of the displayable content elements that were received and/or retrieved with the webpage, and includes parsing the webpage to generate of a model of the hierarchical representation (which may be conceptualized as a tree structure) of the various elements contained in the page—both elements associated with corresponding content and those that are not (such as scripts, styles, and so forth)—as determined by the markup in the webpage. Rendering the webpage thus typically results in the generation of the document object model or content tree for the webpage, and can include the generation of other models or trees representing other aspects of the webpage that are then combined with the document object model or content tree along with the content associated with each of the content elements, optionally applying any style directives received for the content elements, to provide a rendered version of the webpage for display. It may be noted, however, that the style directives may be overridden by settings at the browser application 152 to apply locally configured style directives instead. This part of the process is reflected in FIG. 8, which shows that at 800 a model of the webpage comprising all displayable content elements is generated, and at 810, any prescribed styles for the webpage are applied. This rendered version is then output to the display 110 of the electronic device 100 at 720.

Once the webpage has been rendered as above in this first mode, the browser application 152 (either the layout engine 222 or a further analyzer component, not illustrated in FIG. 2) parses the content in each of the content elements of the webpage to determine whether a subset of displayable content elements can be identified at 730. This parsing generally occurs while the display 110 remains in the first orientation, and while the webpage as currently rendered continues to be displayed at the display 110. The content of each of the displayable content elements may be evaluated to determine a score or weight value to be assigned as the "meaningfulness" of the content, based on objective criteria such as word count or character count of text content associated with the element, link density (i.e., a count of hyperlinks appearing in the element content, weighted according to the word or character count of the element content), and the type of content in the element (e.g., image elements may be scored lower than text elements).

Techniques for performing lexical and other analysis to assess the score or weight value of each content element will be known to those in the art, and can include, for example, the algorithm disclosed in the Readability source code published by Arc90, New York City, USA 10017, and made available at code.google.com/p/arc90labs-readability/. For example, those content elements in the webpage that consist only of an image and a hyperlink without any separate text content outside the image tag defining the image element may receive a low score, because of the lack of separate text content, while a content element consisting of a large block of text following a pattern of words that is determined to be non-repetitive receives a higher score. Those content elements having a score computed at or above a predetermined threshold are included in the subset of displayable content elements. Some content elements, such as logical divisions (<div>), may act as containers for one or more other content elements. If the containing content element contains at least one content element that is determined to have a sufficiently high score, the containing content element may inherit that score and be considered to be part of the subset as well.

Figure 9:
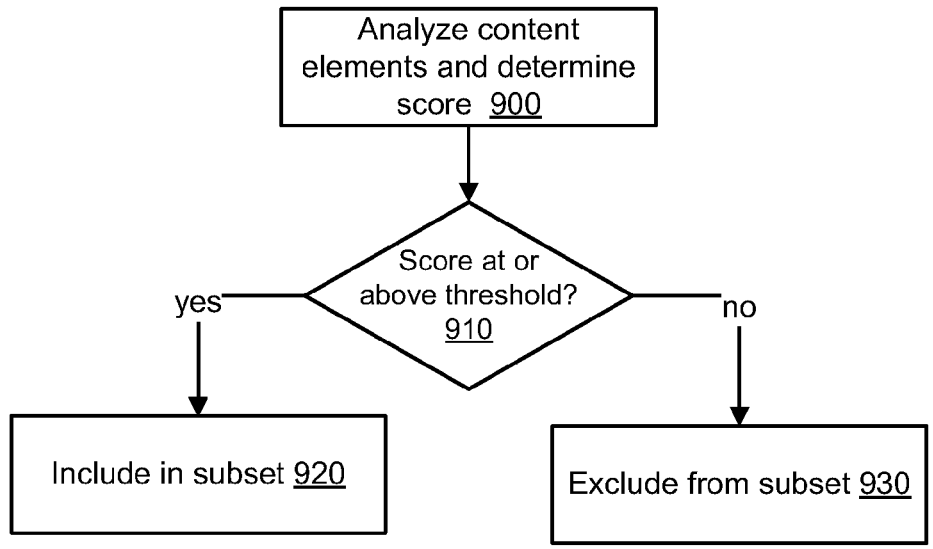
FIG. 9 is a flowchart illustrating a process for identifying a subset of elements for display in the second orientation.

This portion of the process is illustrated in FIG. 9. At 900, the content elements of the webpage are analyzed to determine a score for each element. At 910, a determination is made whether the element scores at or above a predetermined threshold. If it is at or above the threshold, then it is included in the subset 920 (which may be stored as a list of element identifiers in memory). If it is not, then it is not included in the subset 930.

Alternatively, other methods for identifying the content elements for the subset may be used. For example, an algorithm may determine that any text element (e.g., <p>) is included in the subset, or that any image element is excluded from the subset. Or, if the webpage being rendered is received from a network resource (such as a web server), then any content element that contains an object or other content that is served from a network resource having an address (IP address or uniform resource locator) different from the address of the web server providing the webpage, that content element is automatically excluded from the subset, since a different originating address is a typical hallmark of advertisements or other distracting webpage content. This may occur, for example, where the webpage includes embedded image, sound, or video content (or other streaming or multimedia content) that is served from another server. Thus, if the embedded object is served from the web server providing the webpage, the element may be included in the subset, or at least not automatically excluded from the subset (although the element may be excluded based on other criteria).

At 740, it is determined whether a subset has been identified. If a subset was identified, then at 750 the webpage is rendered in the second mode. As reflected in FIG. 10, this rendering may comprise altering or editing the model that was previously generated for rendering the webpage in the first mode at 1000, rather than parsing the webpage anew to generate a new model, and then combining the model with the content associated with the subset of displayable content elements remaining in the model. Editing the model may comprise removing, from the hierarchical arrangement defined in the model, any nodes or references to those elements that are not included in the subset. Alternatively, the webpage could be re-parsed to generate a new model, but excluding those elements of the webpage that were identified as not being part of the subset.

Figure 11:
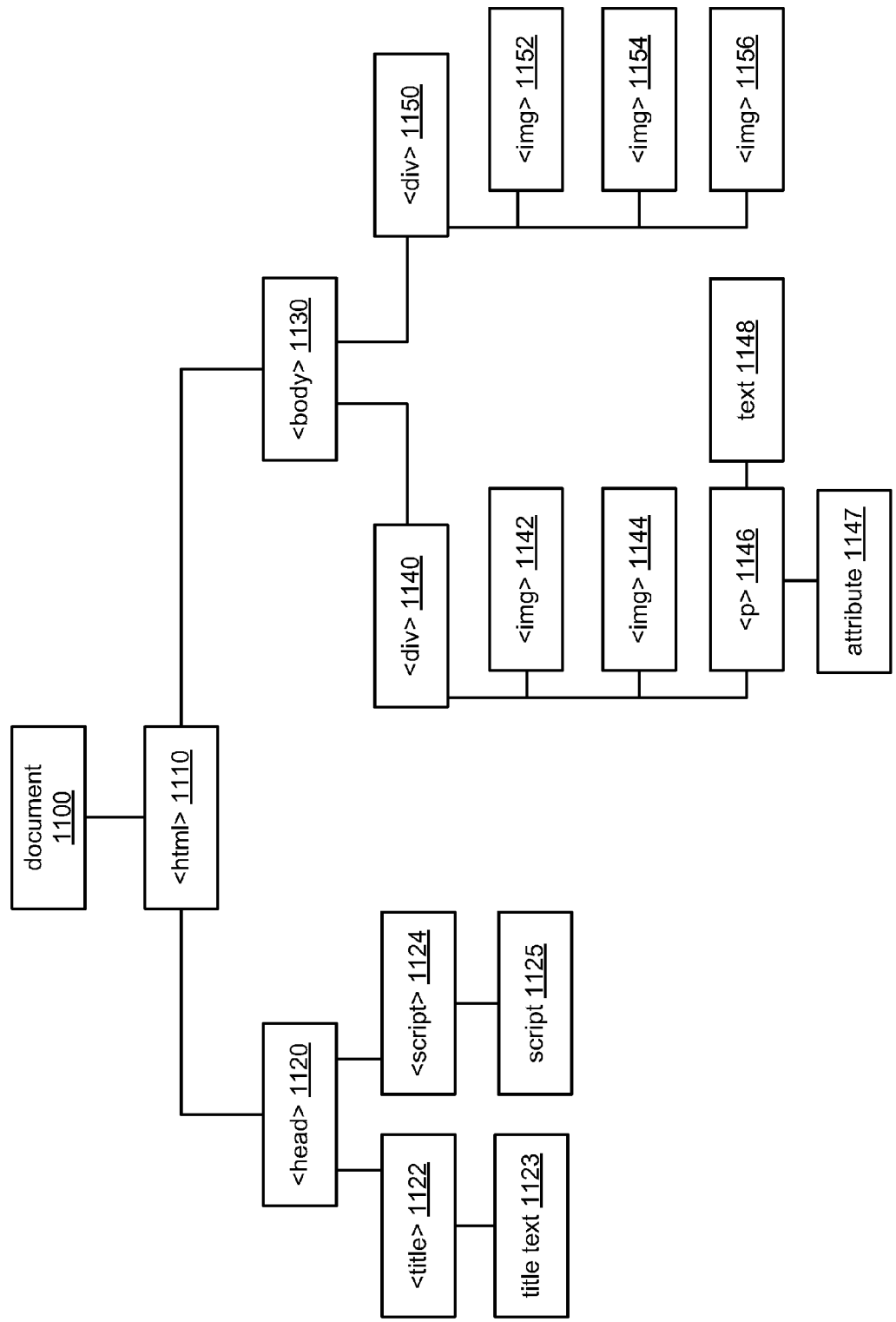
FIG. 11 is a schematic illustrating a render tree hierarchy for the first orientation.
Figure 12:
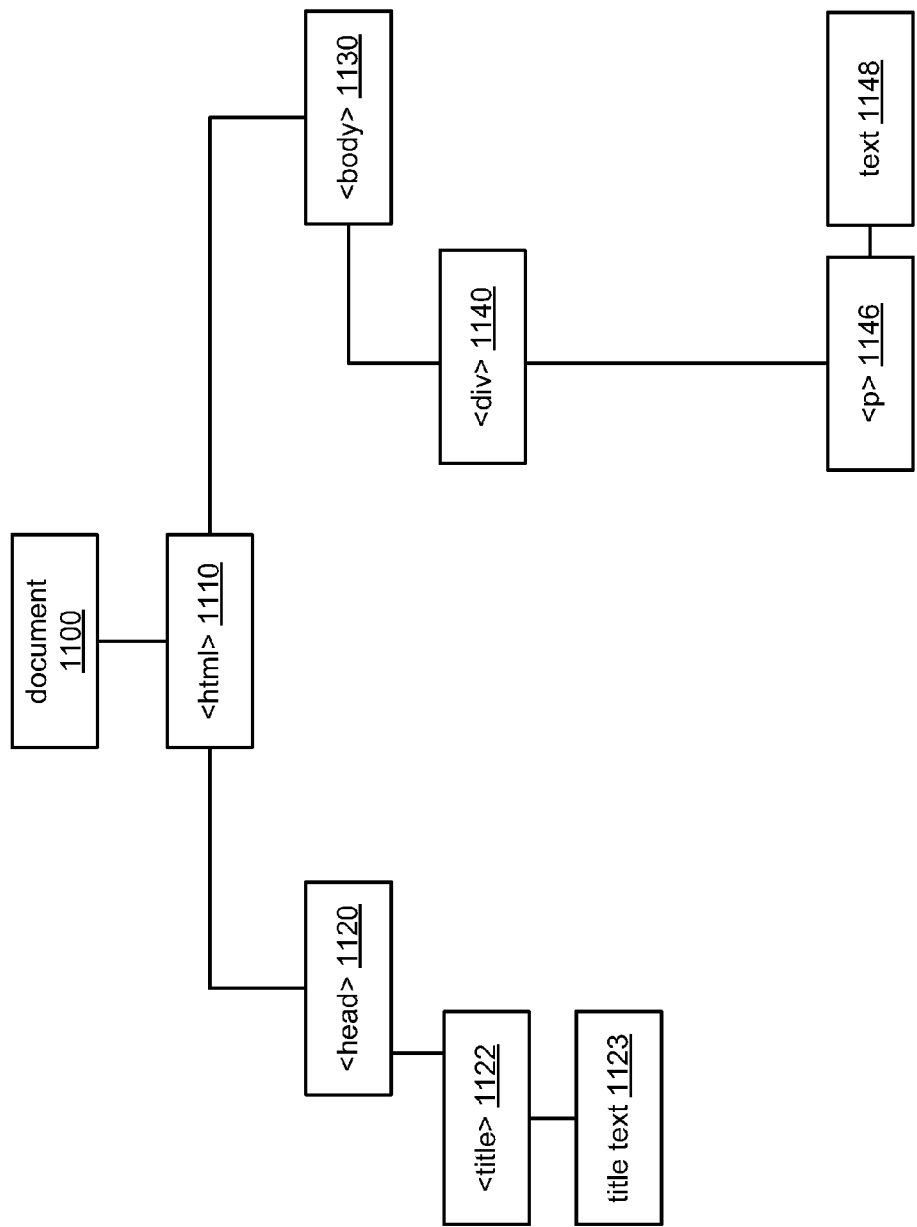
FIG. 12 is a schematic illustrating a render tree hierarchy for the second orientation.

The differences between the model as it may be originally constructed when the webpage is initially rendered at 710, and the model as altered at 750, are shown in FIGS. 11 and 12. FIG. 11 is a schematic diagram of the hierarchy of elements in the webpage displayed in FIG. 4. This schematic is based on the generally understood schema applied to HTML-compliant webpage documents. The root element is the document element 1100, which in this case is an HTML document type, as determined by the first <html> tag. The document further comprises <head> 1120 and <body> 1130 elements. The <head> element may comprise a number of elements, not all of which are shown, including a <title> element 1122 (which is shown in the title bar 410 in FIG. 4) with corresponding title content 1123, and possibly other elements, such as <script> elements 1124 with corresponding script content 1125. These elements 1122, 1124 are optional, and other elements may also be included in the <head> element 1120, but are not shown here.

The <body> element 1130 contains displayable content elements such as division elements 1140, 1150, each of which acts as a container for further content elements. The first element 1140, which corresponds to the element 430 of FIG. 4, contains two images 1142, 1144, corresponding to the images 432, 436 of FIG. 4, as well as a text or paragraph element 1146 corresponding to the element 434 in FIG. 4. The identifiers for the images 1142, 1144 are contained in the <img> tags themselves, while in the paragraph element 1146, the actual text content 1148 is defined following the <p> tag. Any one of the elements may be associated with attributes further defining the behaviour of the elements; in this example for ease of exposition, only one attribute 1147 is illustrated, associated with the paragraph element 1146.

The remaining division element 1150, which corresponds to the element 440 in FIG. 4, contains three image elements 1152, 1154, 1156, which correspond to the images 442, 444, 446 of FIG. 4. Again, these elements may be associated with attributes (not shown). Further, if the image elements 1152, 1154, 1156 behave as hyperlinks (which is common when images are used as advertisements on a webpage), each of these elements may themselves be contained in an anchor element (<a>, not shown), with a hyperlink (href) attribute. The model shown in FIG. 11 may thus be more complex than the simple version shown.

Figure 10:
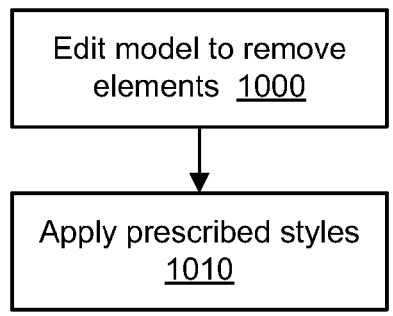
FIG. 10 is a flowchart illustrating a process for preparing a second rendered document for display in a second orientation.

If it is determined that only the text element 1146 of the <body> element 1130 is to be included in the subset of displayable content elements, the edited model after the process of FIG. 10 may resemble that shown in FIG. 12. It can be seen in this case that the <body> element 1130 now contains only two content elements: the paragraph element 1146 with its corresponding text content 1146, and its containing element 1140. The edited model may still retain elements from the original <head> element 1120 depending on the element type, such as the <title> element 1122 and its associated content 1123, while other elements are removed. The resultant altered model is thus less complex, and generally corresponds to the webpage 500 shown in FIG. 5.

In some embodiments, the altered model may be further altered to either further simplify the hierarchical structure (for example, to remove the containing element 1140 so that the only element in the <body> is the paragraph element 1146), or to add additional elements (not shown). For example, the second mode model may be further altered to format the remaining content differently (such as in a two-column layout), to merge different paragraph elements together into one paragraph element, or to add an element containing ancillary information about the webpage.

Returning to FIG. 7, whether or not a subset of displayable content elements is identified, at 760 an orientation change to the second orientation is detected. In response, the webpage as it may be rendered for the second orientation is sent for display at 770. In the case where a subset of displayable content elements was identified, the rendered document sent for display at 770 is the webpage as rendered in the second mode, as described above. If no subset was identified, then the webpage as rendered in the first mode is sent for display; in other words, if no subset was identified, the webpage does not need to be re-parsed and re-rendered, since the same displayable content elements are retained as in the rendering at step 710.

It will be appreciated that regardless whether the webpage to be displayed is rendered in the first or second mode, the visualization module 125 may scale the rendered webpage to fit a dimension of the display 110. However, such scaling does not alter which displayable content elements are rendered for display. Further, in rendering the webpage in either the first or second mode, the layout engine 222 may define positions for the various elements in the rendered webpage according to the viewport (i.e., visible area) available to the webpage, which may be the maximum displayable area of the display 110, or a subregion of the display 110 where the webpage (as a rendered document) is displayed in only a window within the display 110. The available viewport dimensions may thus affect the positioning of individual displayable content elements within the page, with the result that the relative position of the elements in landscape versus portrait orientation may be different. However, these layout differences do not alter which displayable content elements are rendered for display, which is determined through the identification of the subset of displayable content elements described above.

If the rendered documents in the first and second mode are stored in local memory by the browser application 152 or other content viewing application used to render the webpage, the stored versions of the rendered documents may be retrieved and displayed if a request is received to view the same webpage again.

Again, the order of steps in the process may be altered. For example, the determination of an available element subset and rendering of the webpage in the second mode may occur after detection of the orientation change at 760.

In a further embodiment, the generation of the rendered document in the second mode may include obtaining further structured documents identified by the first structured document and including content elements from those further structured documents to the rendered document to be displayed in the second mode. Where the first structured document is a webpage, for example, additional related structured documents (i.e., related webpages) may be identified by parsing the first structured document to identify a hyperlink referencing another webpage having a similar uniform resource indicator, which may be indicative of a multi-page article (e.g., a news report or article with content distributed across multiple linked webpages). If such related documents are identified, they are likewise retrieved and parsed to identify "meaningful" content using the methodologies described above. Any such content elements identified in the related documents are then included in when rendering in the second mode. The second rendered document thus generated will therefore include not only a subset of the content elements in the first structured document, but also a subset of content elements taken from the further structured document or documents, even if retrieval of these further structured documents had not be explicitly requested by a user of the electronic device 100. Therefore, in this further embodiment, rotation of the electronic device 100 or its display 110 to the second orientation triggers retrieval and rendering of additional content elements beyond those included in the first structured document that had already been rendered in the first mode.

As noted previously, these embodiments may be implemented with any suitable input file, such as any structured document, comprising a number of displayable content elements that are typically rendered by any appropriate content viewing application, whether the content viewing application's primary function is mere rendering and display of content or some other function (such as a messaging application for viewing and editing of messages sent and received from and to the electronic device 100). Thus, the process of FIG. 3 can be implemented for any appropriate input document, including HTML-based emails (or other messages comprising structured document content), message attachments, word processing documents, content feeds, other XML-based documents, and the like.

For example, a messaging application 140 executing at the electronic device 100 may, when the device 100 and/or display 110 is in a first orientation, render an HTML-encoded email having a plurality of displayable content elements for display in a first mode similar to the first mode shown in FIG. 4 (optionally invoking the layout engine 222 of the browser application 152 if the messaging application 140 does not have its own layout engine for processing HTML files); and when a change to the second orientation is detected while the message is being displayed in the first mode, show the same message with only a subset of the displayable content elements rendered for display. This implementation with a messaging application 140 may be particularly convenient where the displayable content elements include a number of image elements, which are frequently used in email messages to provide a consistent appearance when displayed on different email platforms. The images are often embedded in the message body such that the messaging application 140 must request the images from a web server when the message is displayed, rather than simply including the images as attachments to the message. However, some email applications are configured to automatically disable retrieval of images over a network when displaying emails. In particular, email applications executing on wireless mobile electronic devices may be configured in this manner to reduce the amount of data transferred to the device over a wireless network. As a result, the display of the email appears "broken", with numerous blank boxes outlined where the images were supposed to appear. In some cases, a text version of the message may follow the images, requiring the user to scroll down to find the legible content. With the foregoing solution, the user, upon finding that a message contains a number of missing images, can simply rotate the electronic device 100 to view another version of the message with those elements removed.

As another example, the above methods of selectively rendering a structured document and presenting a selected rendering in response to a detected orientation detection can be used for word processing, portable document format, or ebook documents containing field codes or tags defining different elements and attributes within the document, such that, for example, in a first orientation a table of contents view is displayed, while in the second orientation a selected one of the chapters or sections of the document is displayed. As still another example, in a first orientation an editing view of the document may be displayed, while in the second orientation, a print preview mode of the document may be displayed.

The foregoing embodiments thus provide a number of advantages, some of which have been identified above. In addition, it will be appreciated that because the browser application 152 or other content viewing application carries out the identification of the subset of displayable content elements to be used to render the structured document in the second mode or second orientation, it is no longer incumbent on the content publisher, i.e. the author of the document, or the party causing the document to be made available, to insert codes or tags in the structured document to identify the principal content elements of the document. Conventionally, the semantic tagging or identification of content in a structured document such as a webpage is carried out by the content publisher. The content publisher could, for example, indicate in the webpage 400 that the paragraph element 434 of FIG. 4 is the principal content of the webpage by tagging it with a recognizable label (such as "<news-item>"), or by including special instructions in script form to define which content elements should be displayable in a given orientation. However, this practice requires that all content viewing applications apply the same rules concerning the identification of <news-item> tags in order to render the webpage in the desired form, or that the electronic device 100 expend additional processing time in executing scripts. Further, an unscrupulous content publisher might tag content that is considered non-essential by the user (e.g., advertisements) as principal content. By offloading the task of identifying the "meaningful" content to the content viewing application, a more consistent and accurate result in parsing the webpage may be achieved.

In some embodiments, the "meaningful" content may be an article content portion of a structured document. For example, a webpage or RSS feed may include one or more article content portions. In Really Simple Syndication (RSS) Microformat draft specification, news articles may include class definitions used to identify principal content. For example a div container could signal the beginning and end of an article content portion (e.g. '<div class="hnews hentry item">') using the hNews draft microformat specification. Other ways of identifying an article content portion will be readily known to those in the art. Upon identifying an article content portion in a structured document as principal content or "meaningful" content, the article content portion may be included in a subset of content elements rendered in the second orientation mode (e.g. portrait orientation). When a portable electronic device is held with the display screen in the portrait orientation, the portable electronic device may resemble the size, shape, and dimension of a book, and therefore the second rendered document (such as in FIGS. 5 and 6) would be the optimal version of the structured document to display. Conversely, when the portable electronic device is held with the display screen in the landscape orientation, the portable electronic device may resemble the size, shape, and dimension of a computer, and therefore the first rendered document (such as in FIG. 4) would be the optimal version of the structured document to display.

It will also be appreciated that the foregoing embodiments also potentially reduce the amount of bandwidth consumed by an electronic device 100 requesting structured documents such as webpages from a network resource, since, when the electronic device 100 detects a change in orientation, it is not necessary to request a further webpage from containing a different set of displayable content elements from the web server. For example, in view of the popularity of mobile electronic devices 100 such as smartphones and tablets used for browsing, a website operator or publisher frequently develops alternate versions of webpages to suit different platforms and network connections (e.g., "mobile" and "desktop" versions). The version that is served to the electronic device 100 is selected according to the specifications of the electronic device 100; for example, whether the device 100 is a mobile computing device such as a tablet or smartphone with a smaller screen size and using a potentially costly or limited wireless network connection, or a desktop computer with a large external screen. These specifications are typically automatically provided to the web server as part of an HTTP request for the webpage transmitted by the electronic device 100; the request frequently includes the version and type of browser application used to make the request, from which the device type can be inferred (e.g., mobile computing device vs. desktop computer). If the request is provided from a tablet or smartphone, the version of the webpage that is served to the requesting device is typically automatically selected to be the mobile version, which usually omits images and other content that would be inconvenient to display on a small tablet or smartphone screen. However, if the user wishes to view the full or desktop version of the page regardless, a separate request must be sent from the mobile electronic device 100 to the server to obtain the other version of the page. With the foregoing embodiments, the device 100 can simply retrieve the full or desktop version of the webpage, and the user is thus provided with the option of viewing a mobile-style rendering of the page without the device 100 having to transmit a request for a further page.

There is thus provided a method in an electronic device having a display screen, the method providing: obtaining a structured document that includes a plurality of content elements; preparing a first rendered document having the plurality of content elements; selecting a subset of said plurality of content elements from the structured document; preparing a second rendered document having said subset of said plurality of content elements; outputting the first rendered document to the display screen while the display screen is in a landscape orientation; detecting a change in orientation of the display screen to a portrait orientation; and in response to said detecting, outputting the second rendered document to the display screen.

In one aspect, said operations of preparing the first rendered document and preparing the second rendered document includes an operation of rendering the first rendered document and an operation of rendering the second rendered document, respectively.

In another aspect, said preparing the second rendered document occurs in response to said detecting.

In a further aspect, said preparing the second rendered document occurs prior to said detecting, and wherein said outputting the first rendered document includes outputting an indicator for display in association with the first rendered document, the indicator indicating an availability of the second rendered document for display.

In still another aspect, the method further provides for detecting a further change in orientation of the display screen to the landscape orientation; and outputting the first rendered document to the display screen.

In yet another aspect, the method further provides for parsing the structured document to generate a model with a hierarchical arrangement of said plurality of content elements, wherein preparing the first rendered document includes using said model to generate the first rendered document; and wherein preparing the second rendered document includes altering said model to remove those ones of the plurality of content elements not included in said subset, and using said altered model to generate the second rendered document.

In another aspect, the subset of said plurality of content elements includes only those content elements with text content.

Still further, in an aspect, the structured document is received from a web server. In still yet a further aspect, the subset of said plurality of content elements includes only content elements with content served from the same web server.

Further, the method can provide that the subset of said plurality of content elements includes those ones of said plurality of content elements having a score at or above a threshold, said score being determined based on at least one of a word count, character count, link density, and content type.

There is also provided an electronic device with a display screen and a processor in communication with the display screen and configured to execute computer readable instructions stored in a memory to: obtain a structured document that includes a plurality of content elements; prepare a first rendered document having the plurality of content elements; select a subset of said plurality of content elements from the structured document; prepare a second rendered document having said subset of said plurality of content elements; output the first rendered document to the display screen while the display screen is in a landscape orientation; detect a change in orientation of the display screen to a portrait orientation; and in response to said detecting, output the second rendered document to the display screen.

In one aspect, the processor is configured to prepare the first rendered document and to prepare the second rendered document by rendering the first rendered document and rendering the second rendered document, respectively.

In another aspect, the processor is configured to prepare the second rendered document in response to said detecting.

In yet another aspect, the processor is configured to: parse the structured document to generate a model with a hierarchical arrangement of said plurality of content elements; wherein preparing the first rendered document includes using said model to generate the first rendered document; and wherein preparing the second rendered document includes altering said model to remove those ones of the plurality of content elements not included in said subset, and using said altered model to generate the second rendered document.

In a further aspect, the processor is further configured to select the subset of said plurality of content elements by selecting those ones of said plurality of content elements having a score at or above a threshold, said score being determined based on at least one of a word count, character count, link density, and content type.

There is also provided a method in portable electronic device having a display screen, the method providing for obtaining a structured document that includes an article content portion, wherein the structured document further includes at least one style directive associated with the article content portion; preparing a first rendered document based upon the article content portion in accordance with said at least one style directive; preparing a second rendered document based upon the article content portion in accordance with a locally configured style directive not included in the structured document; outputting the first rendered document to the display screen while the display screen is in a landscape orientation; detecting a change in orientation of the display screen to a portrait orientation; and in response to said detecting, outputting the second rendered document to the display screen.

In an aspect of this method, the structured document includes a plurality of content elements, and the second rendered document is based upon only a subset of the plurality of content elements that includes the article content portion.

In still another aspect, the locally configured style directive is preconfigured on the portable electronic device.

There is further provided a method at an electronic device for rendering structured documents for display, the method providing: while a display screen of the electronic device is in a first orientation, rendering a structured document for display, the structured document including a plurality of content elements each having corresponding content, by generating a model including a hierarchical arrangement of the plurality of content elements and applying to the model said corresponding content and any style directives included with the structured document for said content elements to provide a rendered structured document; outputting said rendered structured document to a display screen of the electronic device; while said first rendered webpage is being displayed at the display screen detecting a change in orientation of the display screen to a second orientation; further rendering the structured document for display by: identifying a subset of said plurality of content elements; altering the model previously generated to include only those ones of the subset of said plurality of content elements; and applying to the model thus altered any corresponding content to provide a further rendered structured document; and outputting the further rendered structure document to the display screen in response to said detecting.

In a further aspect of the above method, further rendering the structured document for display further includes applying to the model thus altered at least one default style directive stored at the electronic device in place of said style directives included with the structured document.

In another aspect, the structured document comprises a webpage, and the plurality of content elements includes text content elements, and the subset of said plurality of content elements includes only the text content elements.

In still a further aspect, identifying the subset of said plurality of content elements includes: determining a score for each of said content elements based on at least one of a word count, character count, link density, and corresponding type for the corresponding content; and including only those content elements having a score at or above a threshold in the subset of said plurality of elements.

There is also provided a computer or other electronic device-readable medium, which may be physical or non-transitory and which may be provided in a computer program or electronic device program product, storing or otherwise bearing code which, when executed by one or more processors of an electronic device or other computing device, cause said device to carry out any one of the methods described herein.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method in an electronic device having a display screen, the method comprising:
    obtaining a structured document that includes a plurality of content elements;
    after obtaining the structured document, the electronic device:
        preparing a first rendered document having the plurality of content elements, said preparing comprising rendering the first rendered document;
        computing a score for each of the plurality of content elements, the score being determined based on at least one factor selected from the group consisting of: word count, character count, and link density, wherein the link density is based on a count of hyperlinks appearing in the content element in the obtained structured document;
        selecting a subset of said plurality of content elements from the structured document having a computed score at or above a threshold, the subset excluding one or more of the content elements that are advertisements;
        preparing a second rendered document having said subset of said plurality of content elements, said preparing comprising rendering the second rendered document, the second rendered document being a reader-style rendered document having fewer advertisements than the first rendered document;
        outputting the first rendered document to the display screen while the display screen is in a landscape orientation, said outputting the first rendered document including outputting an indicator for display, the indicator indicating an availability of the second rendered document for display; the indicator being actuatable to invoke display of the second rendered document while the display screen remains in the landscape orientation;
        detecting a change in orientation of the display screen to a portrait orientation; and
        in response to said detecting, outputting the second rendered document to the display screen,
        wherein said preparing the second rendered document occurs prior to said detecting.

2. The method of claim 1, wherein the structured document as obtained by the electronic device is obtained without any predefined style directives associated with the orientation of the display screen.

3. The method of claim 1, further comprising, prior to detecting the change in orientation and while the display screen remains in landscape orientation, detecting actuation of the indicator; and in response to said actuation, outputting the second rendered document to the display screen.

4. The method of claim 1, further comprising:
detecting a further change in orientation of the display screen to the landscape orientation; and
outputting the first rendered document to the display screen.

5. The method of claim 1, further comprising:
parsing the structured document to generate a model with a hierarchical arrangement of said plurality of content elements;
wherein preparing the first rendered document includes using said model to generate the first rendered document; and
wherein preparing the second rendered document includes altering said model to remove those ones of the plurality of content elements not included in said subset, and using said altered model to generate the second rendered document.

6. The method of claim 1, wherein the subset of said plurality of content elements includes only those content elements with text content.

7. The method of claim 1, wherein the structured document is received from a web server.

8. The method of claim 7, wherein the subset of said plurality of content elements includes only content elements with content served from the same web server.

9. An electronic device, comprising:
a display screen; and
a processor in communication with the display screen and configured to execute computer readable instructions stored in a memory to:
obtain a structured document that includes a plurality of content elements;
after obtaining the structured document:
prepare a first rendered document having the plurality of content elements;
compute a score for each of the plurality of content elements;
select a subset of said plurality of content elements from the structured document by selecting those ones of said plurality of content elements having a score at or above a threshold, said score being determined based on at least one factor selected from the group consisting of: word count, character count, and link density, wherein the link density is based on a count of hyperlinks appearing in the content element in the obtained structured document, the subset excluding one or more of the content elements that are advertisements;
prepare a second rendered document having said subset of said plurality of content elements, the second rendered document being a reader-style rendered document having fewer advertisements than the first rendered document;
output the first rendered document to the display screen while the display screen is in a landscape orientation;
detect a change in orientation of the display screen to a portrait orientation; and
in response to said detecting, output the second rendered document to the display screen.

10. The electronic device of claim 9, wherein the processor is configured to prepare the first rendered document and to prepare the second rendered document by rendering the first rendered document and rendering the second rendered document, respectively.

11. The electronic device of claim 9, wherein the processor is configured to prepare the second rendered document in response to said detecting.

12. The electronic device of claim 9, wherein the processor is configured to:
parse the structured document to generate a model with a hierarchical arrangement of said plurality of content elements;
wherein preparing the first rendered document includes using said model to generate the first rendered document; and
wherein preparing the second rendered document includes altering said model to remove those ones of the plurality of content elements not included in said subset, and using said altered model to generate the second rendered document.

13. A method in portable electronic device having a display screen, the method comprising:
obtaining a structured document that includes an article content portion, wherein the structured document further includes at least one style directive associated with the article content portion, the at least one style directive not being associated with a particular orientation of the display screen;
preparing a first rendered document based upon the article content portion in accordance with said at least one style directive included with the structured document;
preparing a second rendered document based upon the article content portion in accordance with a locally configured style directive, the locally configured style directive not being included in the structured document;
outputting the first rendered document to the display screen while the display screen is in a landscape orientation;
detecting a change in orientation of the display screen to a portrait orientation; and
in response to said detecting, outputting the second rendered document to the display screen,
wherein the structured document includes a plurality of content elements, and the second rendered document is based upon only a subset of the plurality of content elements that includes the article content portion, and wherein the second rendered document is a reader-style rendered document that includes fewer advertisements than the first rendered document.

14. The method of claim 13, wherein the locally configured style directive is preconfigured on the portable electronic device.

15. A method at an electronic device for rendering structured documents for display, the method comprising:
while a display screen of the electronic device is in a first orientation, rendering a structured document for display, the structured document including a plurality of content elements each having corresponding content, by generating a model including a hierarchical arrangement of the plurality of content elements and applying to the model said corresponding content and any style directives included with the structured document for said content elements to provide a rendered structured document, the style directives included with the structured document not being associated with a particular orientation of the display screen;

outputting said rendered structured document to a display screen of the electronic device;

while said rendered structured document is being displayed at the display screen, detecting a change in orientation of the display screen to a second orientation;

further rendering the structured document for display by:
    identifying a subset of said plurality of content elements, the subset excluding one or more of the content elements that are advertisements and that were included in the structured document when the electronic device was in the first orientation;
    altering the model previously generated to include only those ones of the subset of said plurality of content elements; and
    applying to the model thus altered any corresponding content to provide a further rendered structured document, the rendered document being a reader-style document having fewer advertisements than the first rendered document; and outputting the further rendered structured document to the display screen in response to said detecting.

16. The method of claim 15, wherein further rendering the structured document for display further includes applying to the model thus altered at least one default style directive stored at the electronic device in place of said style directives included with the structured document.

17. The method of claim 15, wherein the structured document comprises a webpage, and the plurality of content elements includes text content elements, and the subset of said plurality of content elements includes only the text content elements.

18. The method of claim 15, wherein identifying the subset of said plurality of content elements includes:
    the electronic device determining a score for each of said content elements based on at least one of a word count, character count, link density, and corresponding type for the corresponding content, the score being determined after the electronic device obtains the document from a server; and
    including only those content elements having a score at or above a threshold in the subset of said plurality of elements.

19. The method of claim 1, wherein the subset excludes all advertisements and the reader-style rendered document excludes all advertisements.

20. The method of claim 1, wherein the subset excludes a sidebar such that the reader-style rendered document excludes all sidebars.

* * * * *